United States Patent [19]

Slovinsky et al.

[11] 3,956,502
[45] May 11, 1976

[54] POLYAMINE ALCOHOLS AS MICROBIOCIDES

[75] Inventors: Manuel Slovinsky, Woodridge; Joseph Matt, Chicago, both of Ill.

[73] Assignee: Nalco Chemical Company, Oak Brook, Ill.

[22] Filed: Sept. 4, 1974

[21] Appl. No.: 503,145

[52] U.S. Cl. ................................. 424/304; 71/67; 424/325
[51] Int. Cl.$^2$ .................. A01N 9/20; A01N 9/24
[58] Field of Search ................. 424/304, 325, 330

[56] References Cited
UNITED STATES PATENTS

| | | | |
|---|---|---|---|
| 2,277,158 | 3/1942 | Sexton | 424/304 X |
| 2,523,177 | 9/1950 | Yowell et al. | 424/325 X |
| 3,152,188 | 10/1964 | Kirkpatrick et al. | 260/584 |
| 3,207,791 | 9/1965 | Meyers et al. | 260/584 |
| 3,252,864 | 5/1966 | Klaui | 424/325 X |
| 3,271,450 | 9/1966 | Wilkinson et al. | 424/325 X |
| 3,418,374 | 12/1968 | Miller, Jr. et al. | 260/583 |
| 3,455,822 | 7/1969 | Kuhn et al. | 424/325 X |
| 3,463,861 | 8/1969 | Wilkinson et al. | 424/325 |
| 3,519,687 | 7/1970 | Schneider et al. | 260/570.4 |
| 3,592,918 | 7/1971 | Havers et al. | 424/325 |
| 3,755,597 | 8/1973 | Abramitis | 424/325 X |
| 3,794,586 | 2/1974 | Klmura et al. | 252/51.5 R |

*Primary Examiner*—Sam Rosen
*Assistant Examiner*—Allen J. Robinson
*Attorney, Agent, or Firm*—John G. Premo; John S. Roberts

[57] ABSTRACT

A series of microbicides which show 1- and 24-hour kill, 48-hour inhibition, and satisfactory simulated cooling tower inhibition against microorganisms such as bacteria, fungi, and algae prevalent in aqueous systems. The compounds are (2-hydroxy R) polyamines produced by reacting an R substituted alkylene oxide utilized in 1–2 mole quantities and reacted with a molar amount of an alkylene polyamine. The R substituent on the alkylene oxide is preferably alkyl where the chain length may be $C_6$–$C_{20}$ as in epoxy alkanes, which may be straight or branched, saturated or unsaturated. The R substituent may also be aryl, aralkyl, or alkaryl, such as styrene oxide. The compounds are known as mono and bis (2-hydroxy R) polyamines depending upon whether 1 or 2 moles of the alkylene oxide are utilized. Protection in simulated cooling tower operation is achieved by dosages ranging as low as 1 ppm with an effective dosage range of 1–100 ppm. These compounds may be present as mixtures due to different points of possible attachment of the hydroxy R moiety to the amine, as, for example, in diethylene triamine, but the primary amine groups are favored for reaction. Additionally, these polyamine alcohols may be further modified by cyano- or haloethylation to introduce a cyanoethyl or haloethyl group at one or more of the remaining available nitrogens, and these products exhibit similar activity against microorganisms.

12 Claims, 1 Drawing Figure

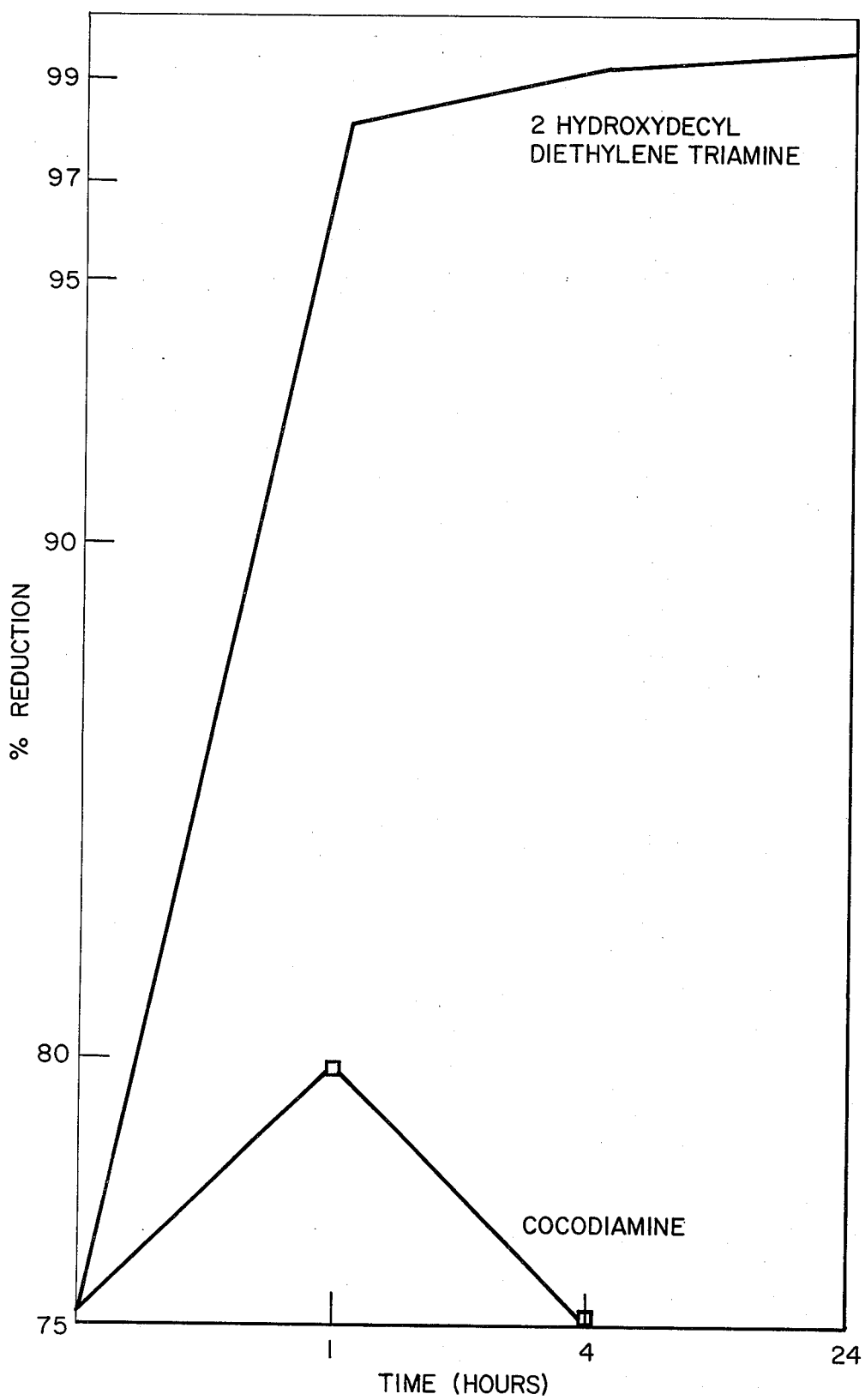

POLYAMINE ALCOHOLS AS MICROBIOCIDES

This application contains subject matter related to a previously filed application entitled "Cyanoethyl and Haloethyl Diamines," by Joseph Matt and Manuel Slovinsky, filed June 10, 1974, Ser. No. 477,732.

The present invention consists of a series of (2-hydroxy R) polyamines produced by the reaction of an R substituted alkylene oxide with an alkylene polyamine. The R substituent on the alkylene oxide is preferably alkyl where the chain length may be $C_6$–$C_{20}$ as in epoxy alkanes, which may be straight or branched, saturated or unsaturated. The R substituent may also be aryl, aralkyl, or alkaryl, such as styrene oxide. The alkylene oxide reactant is utilized in 1–2 moles per mole of alkylene polyamine, thus producing products which are mono and bis substituted hydroxy alkyl polyamines. Included within the term "alkyl polyamine" for purposes of this invention are compounds which are also polyalkyl polyamines such as diethylene triamine, pentaethylene tetramine, as well as alkyl diamines such as ethylene diamine and propylene diamine. The possible reactions and the preference of the epoxy ring opening and attaching to a primary amine are set out in the reaction scheme below.

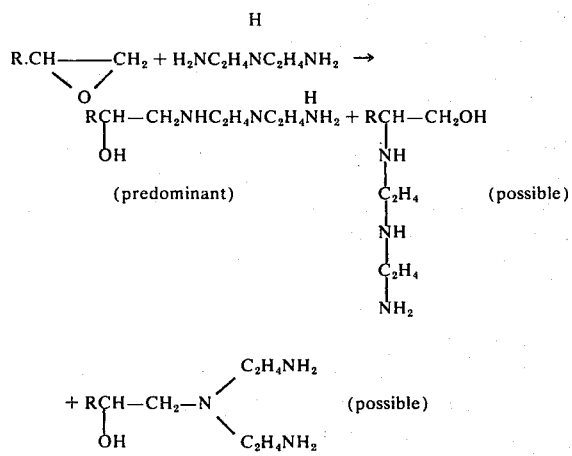

Exemplary of specific products which are preferred are N'-(2-hydroxy $C_{11-14}$ alkyl) diethylene triamine and $N^1$-$N^5$ (bis 2-hydroxy decyl) tetraethylene pentamine.

The products of this invention consist of a series of products which are preferbly 2-hydroxy alkyl polyamines and members of this group have shown satisfactory effectiveness against bacteria, such as *Aerobacter aerogenes;* fungi, such as *Aspergillus niger;* as well as common algae prevalent in aqueous circulating systems such as cooling towers. It is of interest that aqueous circulating systems, both in the recirculating and once-through type, have in the past shown susceptibility to microbial contamination by slime, algae, and occasionally by sulfate-reducing bacteria. Specifically, the tests used to simulate microbial attack include 1- and 24-hour kill, 48-hour inhibition, and recirculating tests designed to simulate the milieu of a cooling tower where the operational pH is usually in the range 5.0–8.5.

The alkylene oxide or 1,2 epoxy alkane is mono-substituted by a single R group on one of the alpha carbon atoms

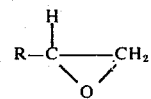

where R is selected from a hydrocarbon radical containing from 6–20 carbon atoms selected from the group consisting of alkyl, aryl, alkaryl, and aralkyl radicals. Of the above, the alkyl substituents are preferred.

The term "alkylene oxide" is also intended and defined to include a substituent where R is a glycidyl ether such as

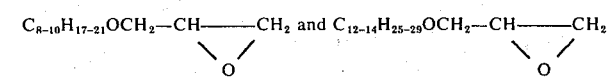

(Epoxides Nos. 7 and 8—Procter and Gamble Company).

The alkylene oxide is utilized in 1–2 molar quantities with respect to the amine to produce, respectively, mono and bis products, which are (2-hydroxy R) polyamines.

The alkylene polyamine utilized is selected from di- and polyamines including both alkyl polyamines and polyalkyl polyamines such as alkylene diamines, diethylene triamine, triethylene tetramine, tetraethylene pentamine, and higher analogs such as polyamine H and dihexylene triamine (DuPont 248) as well as alkyl diamines such as ethylene diamine and propylene diamine. (Polyamine H is a high boiling material and is defined as bottoms from diethylene triamine and contains 23–28 percent of diethylene triamine; higher homologs make up the balance.)

In the above reaction where 2 moles of the alkylene oxide are utilized, bis hydroxy R polyamines are produced and in general the primary amines are favored as reaction sites.

The cyanoethyl and haloethyl derivatives may be prepared as follows. The cyano groups are introduced in the (2-hydroxy R) polyamine via a suitable nitrogen site by the action of acrylonitrile $CH_2$=CHCN or methacrylonitrile $CH_2$=$CCH_3$CN. This reaction basically is more fully described in Ser. No. 477,732 Slovinsky and Matt, incorporated by reference (pages 1–4) herewith. This additional reaction shows preference for reactivity on the primary amine groups and may give mono or bis products. The nitriles may also react at the same sites as were utilized in the main reaction used previously to produce the hydroxide substituents utilizing the alkylene oxide reactants. The reaction produces compounds which, in addition to being hydroxy substituted, are β-substituted propionitrile derivatives. The propionitrile group residue —$CH_2CH_2CN$ is termed the β-cyanoethyl or (2-cyanoethyl) group and the present reaction is known as cyanoethylation of the originally formed polyamine alcohols.

The haloethyl derivatives may be similarly prepared using ethylene dihalide, such as ethylene dichloride, which is preferred among the commercial halogens; viz, the chloride, iodide, and bromide. The basic reaction is similarly described more fully in Ser. No. 477,732 above, page 2 herewith incorporated by reference. The haloethyl substituents are produced generally from using an excess of ethylene dihalide and introduced into the (2-hydroxy R) polyamine in the same fashion as the cyanoethyl groups were introduced as described above.

The following equations are illustrative of the general modus for preparing the cyanoethyl and haloethyl modifications:

a. $N^1$-$N^3$ Bis (2-hydroxy $C_{11-14}$) diethylene triamine + acrylonitrile → $N^1$ cyanoethyl $N^1$, $N^3$ Bis (2-hydroxy $C_{11-14}$) diethylene triamine

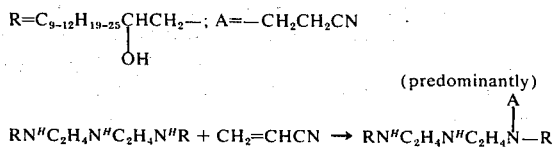

(predominantly)

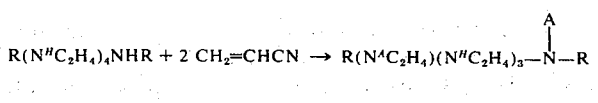

and also $RN^HC_2H_4$ $NC_2H_4NHR$ b. $N^1N^5$ Bis (2-hydroxy decyl) tetraethylene pentamine + 2 acrylonitrile → Bis cyanoethyl bis (2-hydroxy decyl) tetraethylene pentamine

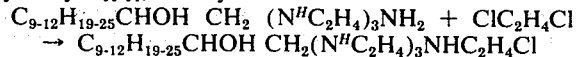

+ other forms where 2 NH are replaced by 2NA gps.
where
R = $C_8H_{17}CHOHCH_2$—
A = $-CH_2-CH_2CN$ c. $N^1$ (2-hydroxy $C_{11-14}$) triethylene tetramine + excess ethylene dichloride → $N^1$ chloroethyl $N^4$(2-hydroxy $C_{11-14}$) triethylene tetramine
$C_{9-12}H_{19-25}CHOH$ $CH_2$ $(N^HC_2H_4)_3NH_2$ + $ClC_2H_4Cl$
→ $C_{9-12}H_{19-25}CHOH$ $CH_2(N^HC_2H_4)_3NHC_2H_4Cl$ FIG. 1 is a chart against time showing comparative reduction of bacteria for the compound N'-(2-hydroxy $C_{11-14}$ alkyl) diethylene triamine against cocodiamine.

PRIOR ART

The prior art believed to be pertinent to the present invention is set out below.

U.S. Pat. No. 3,152,188 Kirkpatrick et al. (Nalco)
Production of polyalkylene polyamines which are N-substituted by reaction with two different types of hydrocarbon epoxides.

U.S. Pat. No. 3,207,791 Meyers et al. (Atlantic Refining)
Reaction of substituted amino-alcohols with alkylene oxides is described at columns 1-2.

U.S. Pat. No. 3,418,374 Miller et al. (Armour)
Alkoxylation of polyamines where 2-200 moles and more may be added to each amine group is described at column 5, lines 12-22.

U.S. Pat. No. 3,775,597 Abramitis (Akzona)
Method of killing mosquito larvae where the active agent is a cyanoethylated mono amine such as N-(2-cyanoethyl) dodecylamine.

U.S. Pat. No. 3,794,586 Kimura et al. (Nippon Oil)
A lube oil composition containing hydroxy alkyl substituted polyamines where the allegation of utility is oxidation stability and cleaning and dispersing properties.

Offen. DP No. 2,151,719 (Procter and Gamble)
Polymeric quaternary 2-hydroxyalkylammonium compounds with bactericidal activity from secondary polyamines.

THE REACTION

The present reaction producing (2-hydroxy R) polyamines and involving an opening of the epoxy ring and attachment to one or both of the favored primary amines in an alkylene polyamine is conducted with 1 or 2 moles of alkylene oxide per mole of alkylene polyamine. A preferred procedure here utilized is conducted after purging under an inert gas blanket such as nitrogen. The preferred temperature of reaction utilized is in the range 130°-140°C and the reaction is caried out under vacuum commencing at about 100 mm and with the pressure rising gradually to about 400 mm after 3-4 hours.

The further additive reactions involve cyanoethylation with acrylonitrile or methacrylonitrile and haloethylation with an ethylene dihalide. The cyanoethyl derivatives are prepared using generally moderate temperatures of about 60°-70°C for preferably 1-3 hours and molar ratios of 1:2 of the reactant nitrile as compared with (2-hydroxy R) polyamine. The haloethyl derivatives are prepared preferably under moderate pressure at temperatures ranging from 120°-150°C using a molar excess of ethylene dihalide where the ratio of ethylene dihalide to (2-hydroxy R) polyamine is from about 3-5:1.

MICROBICIDAL ACTIVITY

Selected members of the reaction products of the present invention were tested for microbicidal or cidal effect by standardized tests known as the Kim test, defined post in the examples. The data showed both for bacteria and fungi that the product showed activity ranging down to 1 ppm and generally in the area from 1-25 or 1-50 ppm both in the kill tests and in the inhibition tests. Additionally, in the simulated cooling tower tests set out in Example 1 and FIG. 1, there is data showing comparative reduction of bacteria for the compound N'-(2-hydroxy $C_{11-14}$ alkyl) diethylene triamine against cocodiamine.

EXAMPLE 1

$C_{11-14}$ Oxide + Diethylene triamine N'-(2-hydroxy alkyl) diethylene triamine Diethylene triamine (33.1 lbs, 0.318 lb-moles) was charged to a 20 gallon glass-lined reactor equipped with a stirrer, heater, cooling coils, vacuum, and $N_2$ source. After one-half hour's purging with nitrogen, a vacuum of 100 mm was applied. The amine was heated to 130°C, and 68.6 lbs (0.319 lb-moles) of $C_{11-14}$ oxide was run in during 3.5 hours with stirring, the pressure rising gradually to 406 mm, temperature remaining between 130°and 132°. One-half hour after all was in, a sample examined by infrared showed absence of epoxide. The liquid product was discharged and became a semi-solid at room temperature.

A sample of the product of this experiment was analyzed in comparative fashion against cocodiamine in a procedure similar in nature to that set out in Nalco Reprint No. 119, October, 1962, entitled "Laboratory Tests for Heat Transfer Surface Inhibition in Cooling Water" utilizing the diagram of FIG. 1, page 2. The results of the comparison showed that for inhibition against the bacteria Aerobacter aerogenes ATCC 13048 (American Type Culture Collection), the protection achieved by the compound of Example 1 was superior to the diamine registering at 4 hours 99 percent reduction of bacteria against 75 percent for cocodiamine, and the results are further shown in FIG. 1.

EXAMPLE 2

$N^1N^5$ Bis (2-hydroxy decyl) tetraethylene pentamine 33.8 gms (0.2 mole) of 1,2-epoxy decane (Viking Chemical Company) was added slowly with stirring over one-fourth hour to 18.9 gms (0.1 mole) of tetraethylene pentamine kept at 130°C. The mixture was kept at 130°–140°C for 4 hours until the infrared showed virtual disappearance of the characteristic epoxy and primary amine group absorptions. The product, a thick oil, was substantially the desired 1,5 bisadduct.

EXAMPLE 3

Utilizing the product of Example 1, namely, $N'$-(2-hydroxy alkyl) diethylene triamine, which was prepared from 1,2 epoxy alkane and diethylene triamine, an additional compound was prepared. Acrylonitrile (11.1 gms, 0.208 mole) was added dropwise over 0.5 hour to 55.8 gms (0.208 mole) of $N'$-(2-hydroxy alkyl) diethylene triamine. The reaction was run at 60°C for 2 hours till infrared examination showed the disappearance of primary amine. The product was an oil.

EXAMPLE 4

Cyanoethyl $N^1N^3$ bis (2-hydroxy $C_{11-14}$ alkyl) diethylene triamine

Bis (2-hydroxy $C_{11-14}$ alkyl) diethylene triamine (48.2 gms, 0.1 mole) obtained from treating 1 mole of diethylene triamine with 2 moles of $C_{11-14}$ oxide is heated to 70°C. Acrylonitrile (4.3 gms, 0.1 mole) is added dropwise with stirring over half an hour and the mixture is stirred for 1 hour. At this point there is not further refluxing of acrylonitrile. Infrared examination of the semisolid product shows presence of the cyano group and decreased secondary amine. The cyanoethyl group may be on any one of the nitrogen atoms.

EXAMPLE 5

Bis (cyanoethyl) bis (2-hydroxy decyl) tetraethylene pentamine

The oily reaction products from 2 moles of epoxy decane and 1 mole of tetraethylene pentamine (52.7 gms, 0.1 mole) is heated at 70°C as in the preceding example with 0.2 moles (10.6 gms) of acrylonitrile until refluxing ceases and for one hour additional. The product is a thick oil with cyano group present and decreased secondary amine shown by infrared examination.

EXAMPLE 6

$N^1$ chloroethyl $N^4$ (2-hydroxy $C_{11-14}$ alkyl) triethylene tetramine $N^1$ (2-hydroxy $C_{11-14}$ alkyl) triethylene tetramine (33.5 gms, 0.1 mole) made from $C_{11-14}$ oxide and triethylene tetramine as in Example 4 is heated with stirring in a stainless bomb for 8 hours at 125°C with an excess of ethylene dichloride (33 gms, 0.33 mole) in 50 ml water. At the end of the reaction the bomb is opened, the mixture is removed while hot, basified with caustic and the organic layer is washed free of salt with water and dried with anhydrous sodium sulfate. Removal of excess ethylene dichloride leaves 39 gms of an oil which is shown by infrared to contain the CCL linkage, increased secondary amine, and no primary amine.

EXAMPLE 7

Kim Inhibition and Kill Tests

This series of tests utilized Kimax screw cap culture tubes hereinafter referred to as Kim tubes and the Kim tests. The tests were designed to show both inhibition and kill against a selected bacteria and also a selected fungus. The culture medium utilized at pH 8.5 was a broth prepared as follows:
  1.84 grams NaOH pellets
  5.0 grams $KH_2PO_4$
  8 grams Difco yeast extract
  1 liter deionized $H_2O$ The above ingredients were dissolved and dispensed in 250-ml, 500-ml and 1-liter heat resistant, screw-capped bottles and sterilized at 15 pounds for 15 minutes.

In the bacteria tests, the test organism was *Aerobacter aerogenes*, ATCC 13048. In the fungus test, the test organism was *Aspergillus niger*, ATCC 6275.

Bacteria Test

Inhibition Test Method — 48 hours

1. Using a 1 ml serological pipette, an amount of chemical was introduced, which when diluted with the broth will give the desired concentration.
2. Immediately before starting the test, the broth was inoculated with the test organism (0.4 ml inoculum/200 ml broth).
3. 10 ml of inoculated broth were added to each tube at pH 8.5.
4. The contents of the tubes were well mixed and incubated at 86°F for 48 hours.
5. Utilizing pH 8.5, the inhibiting range was determined by observing the presence or absence of turbidity in the tubes. The highest dilution which showed turbidity was a dilution at which there was no inhibition. The lowest dilution showing no turbidity was the concentration at which inhibition occurred.

Kill Tests a. 1-Hour Kill

One hour after addition of inoculated broth to the tubes with the chemical, a loopful from each tube was aseptically transferred into sterile nutrient broth tubes. These latter broth tubes were incubated at 98°F for 24 hours. The turbidity as growth or no growth was read at each concentration level.

b. 24-Hour Kill

In this procedure after addition of the inoculated broth of the tubes with the chemical, a loopful was transferred and the procedure in (a) was followed.

Fungus Test

In the mold inhibition test, materials were utilized as in the bacteria test above, using vials 25 × 95 mm, 8-dram. As a test organism, *Aspergillus niger*, ATCC 6275, was utilized. The inoculum or test organism was prepared as follows:

Sabouraud Dextrose Agar slants were incubated 5 days at 30°C. The cells were harvested by washing slant with 5 cc sterile DI water and transferred to glass screw-cap bottles containing sterile glass beads. The agar slant was rewashed and the spores dispersed by agitation before use and stored in the refrigerator.

Using a 1 ml serological pipette, and without touching the sides of the tube, the selected amount of chemical to be tested was introduced, which, when diluted with the broth, gave the desired concentration.

Immediately before starting the test, the inoculation was achieved by 0.3 ml of fungal culture/200 ml of broth, together with mixing. The inoculated broth was added to the tube and incubated at 30°C for 5 days. The contents of each tube was mixed well.

The test for 1- and 24-hour kills was made by aseptically transferring one loopful from each tube into sterile nutrient broth tubes and incubated at 30°C for 5 days.

The inhibition range was determined by observing fungi within the media and mold overgrowth on the surface of the culture medium. The highest dilution showing the presence of growth was a dilution at which there was no inhibition. The lowest dilution showing no fungal growth was the concentration at which inhibition occurred. The 1- and 24-hour observations were determined in the same manner as the inhibition tests by reading the nutrient broth tubes.

In accordance with the test noted above, selected products of this invention were tested and the results of the tests are set out in the table below.

Results: The activity of the compounds both against bacteria and fungi showed satisfactory low ppm's ranging down to about 1 ppm for activity and universally for the great part in the range 5–25 ppm.

TABLE I

Hydroxy Alkyl Polyamines from Long-Chain Epoxides and Polyamides

| | Activity at pH 8.5 | | | | | |
|---|---|---|---|---|---|---|
| | Aerobacter aerogenes | | | Aspergillus niger | | |
| | 1 hr Kill ppm | 24 hr Kill ppm | 48 hr Inhib. ppm | 1 hr Kill ppm | 24 hr Kill ppm | 5 day Inhib. ppm |
| Components | | | | | | |
| $C_{10}$ Epoxide + Ethylene Diamine | >25 | >25 | >25 | >25 | >25 | 2.5–5 |
| $C_{10}$ Epoxide + Diethylene Triamine | | | 2.5–5 | | | 1–2.5 |
| $C_{10}$ Epoxide + Diethylene Triamine | | | 2.5–5 | | | 5–10 |
| $C_{10}$ Epoxide + Triethylene Tetramine | <100 | 50–100 | 25–50 | >25 | >25 | 10–25 |
| $C_{10}$ Epoxide + Tetraethylene Pentamine | | | 2.5–5 | | | 1–2.5 |
| $C_{10}$ Epoxide + Diethylene Triamine + Acrylonitrile | >25 | 10–25 | 10–25 | >25 | >25 | 1–2.5 |
| 2 $C_{10}$ Epoxide + 1 Diethylene Triamine | <25 | 25–5 | 2.5–5 | >25 | 2.5–5 | 1–2.5 |
| 2 $C_{10}$ Epoxide + 1 Tetraethylene Pentamine | >25 | 10–25 | 5–10 | >25 | >25 | 1–2.5 |
| $C_{11-14}$ Epoxide + Ethylene Diamine | >25 | 10–25 | 10–25 | >25 | 2.5–5 | 1–2.5 |
| $C_{11-14}$ Epoxide + Diethylene Triamine | >25 | 5–10 | 5–10 | >25 | 5–10 | 1–2.5 |
| $C_{11-14}$ Epoxide + Diethylene Triamine (Pilot Plant) | >25 | 10–25 | 10–25 | >25 | 10–25 | 1–2.5 |
| $C_{11-14}$ Epoxide + Triethylene Tetramine | >25 | >25 | 10–25 | >25 | >25 | 1–2.5 |
| $C_{11-14}$ Epoxide + Tetraethylene Pentamine | 10–25 | 10–25 | 10–25 | >25 | >25 | 1–2.5 |
| 2 $C_{11-14}$ Epoxide + Diethylene Triamine | >10 | >10 | >10 | >10 | 5–10 | 1–2.5 |
| $C_{12}$ Epoxide + Diethylene Triamine | >25 | 10–25 | 10–25 | >25 | 2.5–5 | <1 |
| 2 $C_{12}$ Epoxide + 1 Diethylene Triamine | >25 | >25 | >25 | >25 | >25 | 2.5–5 |
| $C_{15-18}$ Epoxide + Ethylene Diamine | >25 | >25 | >25 | >25 | >25 | 5–10 |
| $C_{15-18}$ Epoxide + Diethylene Triamine | >25 | 10–25 | 10–25 | >25 | 5–10 | 1–2.5 |
| $C_{15-18}$ Epoxide + Triethylene Tetramine | >100 | >100 | 25–50 | >25 | 10–25 | 2.5–5 |
| $C_{15-18}$ Epoxide + Tetraethylene Pentamine | | | 5–10 | | | 1–2.5 |
| $C_{8-10}$ Glycidyl Ether + Diethylene Triamine | >25 | 10–25 | 5–10 | >25 | >25 | 1–2.5 |
| $C_{12-14}$ Glycidyl Ether + Diethylene Triamine | >25 | >25 | >25 | >25 | 10–25 | 1–2.5 |
| Styrene Oxide + Ethylene Diamine | >50 | >50 | >50 | >50 | >50 | 25–50 |
| Styrene Oxide + Diethylene Triamine | >50 | >50 | >50 | >50 | >50 | 25–50 |
| Cocodiamine | 25 | 1–5 | 1–5 | 5 | 0.5–1 | 0.25–0.5 |

Note:
In the above Table I, the $C_{10}$, $C_{11-14}$, $C_{12}$, $C_{15-18}$, $C_{8-10}$, and $C_{12-14}$ refer to commercial and laboratory prepared mono-alkyl substituted epoxides.

What is claimed is:

1. A bactericidal or fungicidal composition effective against bacteria or fungi and suitable for utilization in cooling tower operation consisting of an antibacterial or antifungal effective amount of a compound selected from the group consisting of:
   $N^1$-(2-hydroxy $C_{11-14}$ alkyl) diethylene triamine;
   $N^1N^5$ Bis (2-hydroxy decyl) tetraethylene pentamine;
   $N^1$ cyanoethyl $N^1,N^3$ Bis (2-hydroxy $C_{11-14}$ alkyl) diethylene triamine;
   $N^1N^5$ Bis (2-hydroxy decyl) tetraethylene pentamine;
   $N^1$ chloroethyl $N^4$ (2-hydroxy $C_{11-14}$ alkyl) triethylene tetramine
in an aqueous carrier.

2. The bactericidal or fungicidal composition according to claim 1 wherein the compound is $N^1$- (2-hydroxy-$C_{11-14}$ alkyl) diethylene triamine.

3. The bactericidal or fungicidal composition according to claim 1 wherein the compound is $N^1N^5$ Bis (2-hydroxy-decyl) tetraethylene pentamine.

4. The bactericidal or fungicidal composition according to claim 1 wherein the compound is $N^1$ cyanoethyl $N^1,N^3$-Bis (2-hydroxy $C_{11-14}$ alkyl) diethylene triamine.

5. The bactericidal or fungicidal composition according to claim 1 wherein the compound is $N^1N^5$ Bis cyanoethyl $N^1N^5$ Bis(2-hydroxydecyl) tetraethylene pentamine.

6. The bactericidal or fungicidal composition according to claim 1 wherein the compound is $N^1$ chloroethyl-$N^4$ (2-hydroxy $C_{11-14}$ alkyl) triethylene tetramine.

7. A method of inhibiting bacteria or fungi in aqueous cooling tower systems which comprises maintaining in said systems an antibacterial or antifungal effective amount of a compound which is selected from the group consisting of:
   $N^1$-(2-hydroxy $C_{11-14}$ alkyl) diethylene triamine;
   $N^1N^5$ Bis(2-hydroxy decyl) tetraethylene pentamine;
   $N^1$ cyanoethyl $N^1,N^3$ Bis(2-hydroxy $C_{11-14}$ alkyl) diethylene triamine;
   $N^1N^5$ Bis cyanoethyl $N^1N^5$ Bis(2-hydroxy decyl) tetraethylene pentamine;

$N^1$ chloroethyl $N^4$(2-hydroxy $C_{11-14}$ alkyl) triethylene tetramine.

8. The method of inhibiting bacteria or fungi according to claim 7 wherein the compound is $N^1$-(2-hydroxy-$C_{11-14}$ alkyl) diethylene triamine.

9. The method of inhibiting bacteria or fungi according to claim 7 wherein the compound is $N^1N^5$ Bis(2-hydroxydecyl) tetraethylene pentamine.

10. The method of inhibiting bacteria or fungi according to claim 7 wherein the compound is $N^1$ cyanoethyl-$N^1,N^3$ Bis(2-hydroxy $C_{11-14}$ alkyl) diethylene triamine.

11. The method of inhibiting bacteria or fungi according to claim 7 wherein the compound is $N^1N^5$ Bis cyanoethyl $N^1N^5$ Bis(2-hydroxydecyl) tetraethylene pentamine.

12. The method of inhibiting bacteria or fungi according to claim 7 wherein the compound is $N^1$ chloroethyl-$N^4$(2-hydroxy $C_{11-14}$ alkyl) triethylene tetramine.

* * * * *